W. N. SELIG.
MOVING PICTURE CAMERA.
APPLICATION FILED MAR. 6, 1917.
1,253,285.
Patented Jan. 15, 1918.
5 SHEETS—SHEET 2.
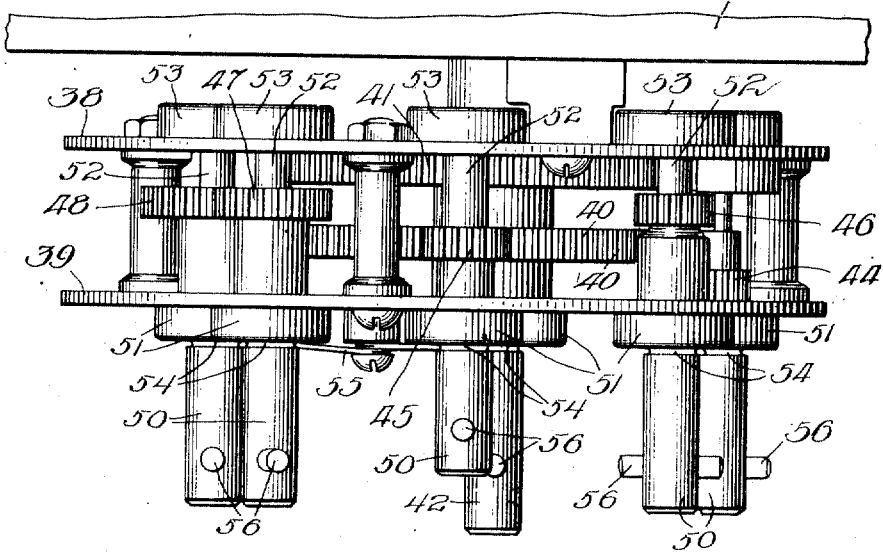
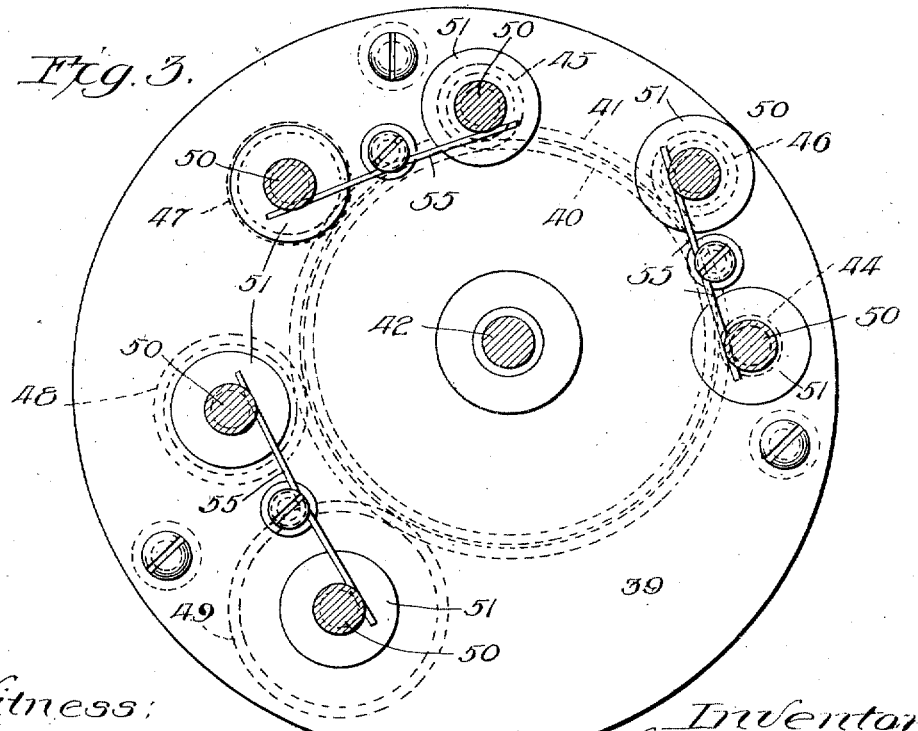
Witness:
Harry S. Gaither
Inventor
William N. Selig
by Chrining & Chrining
Attys

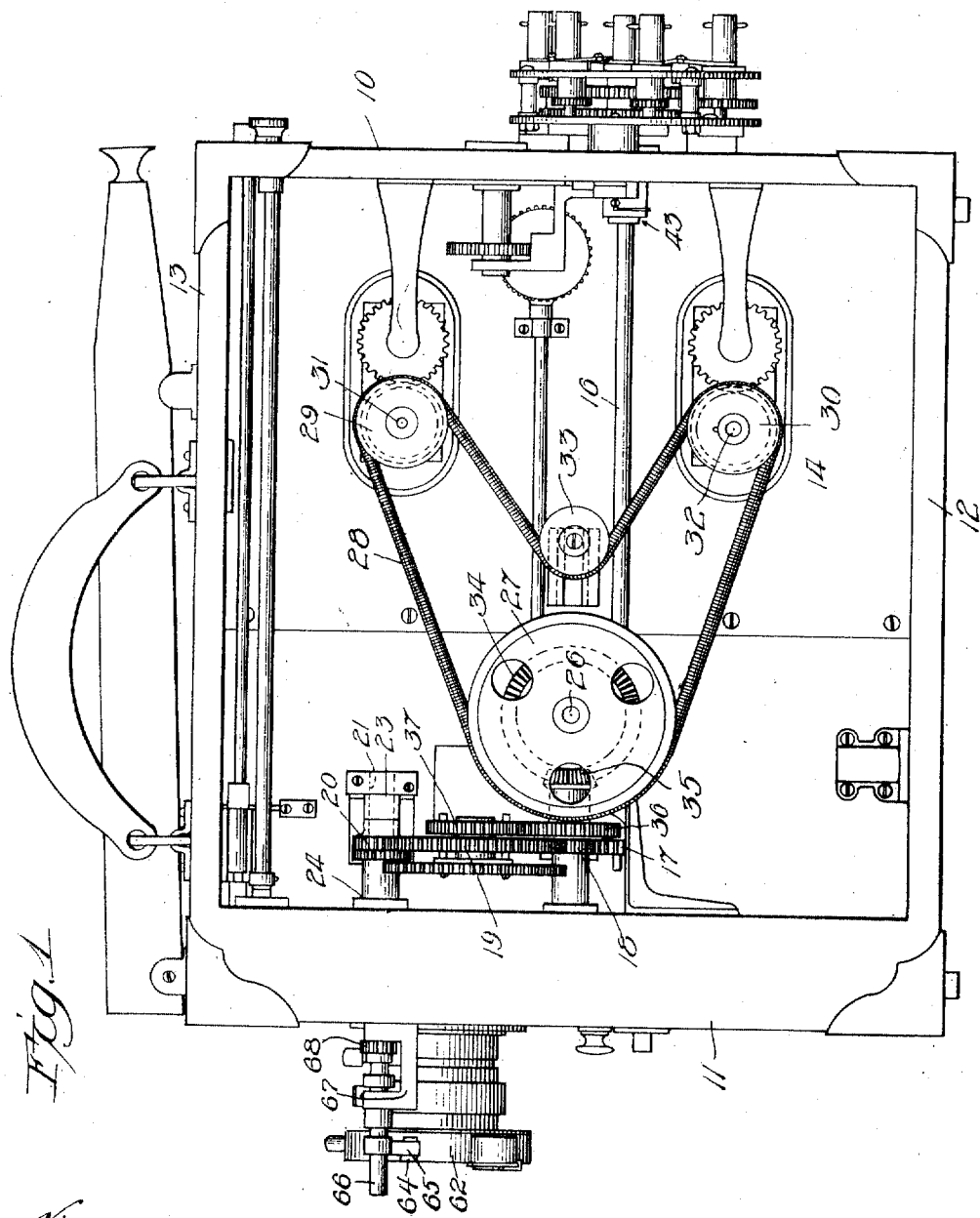

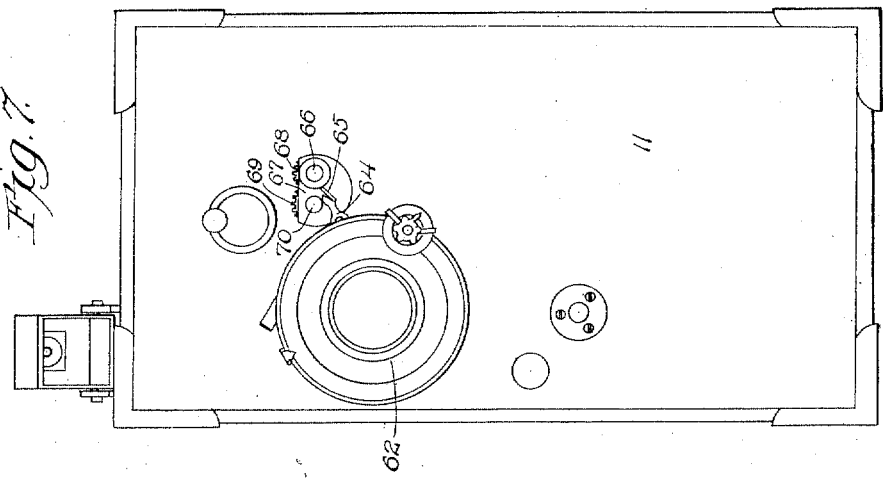
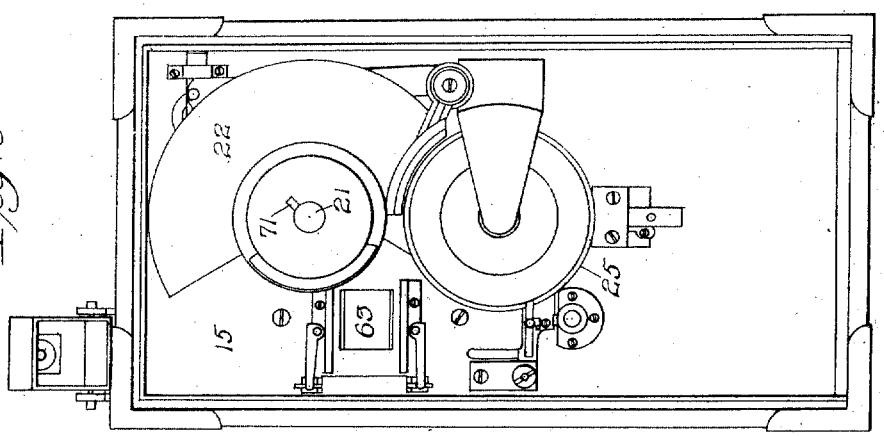

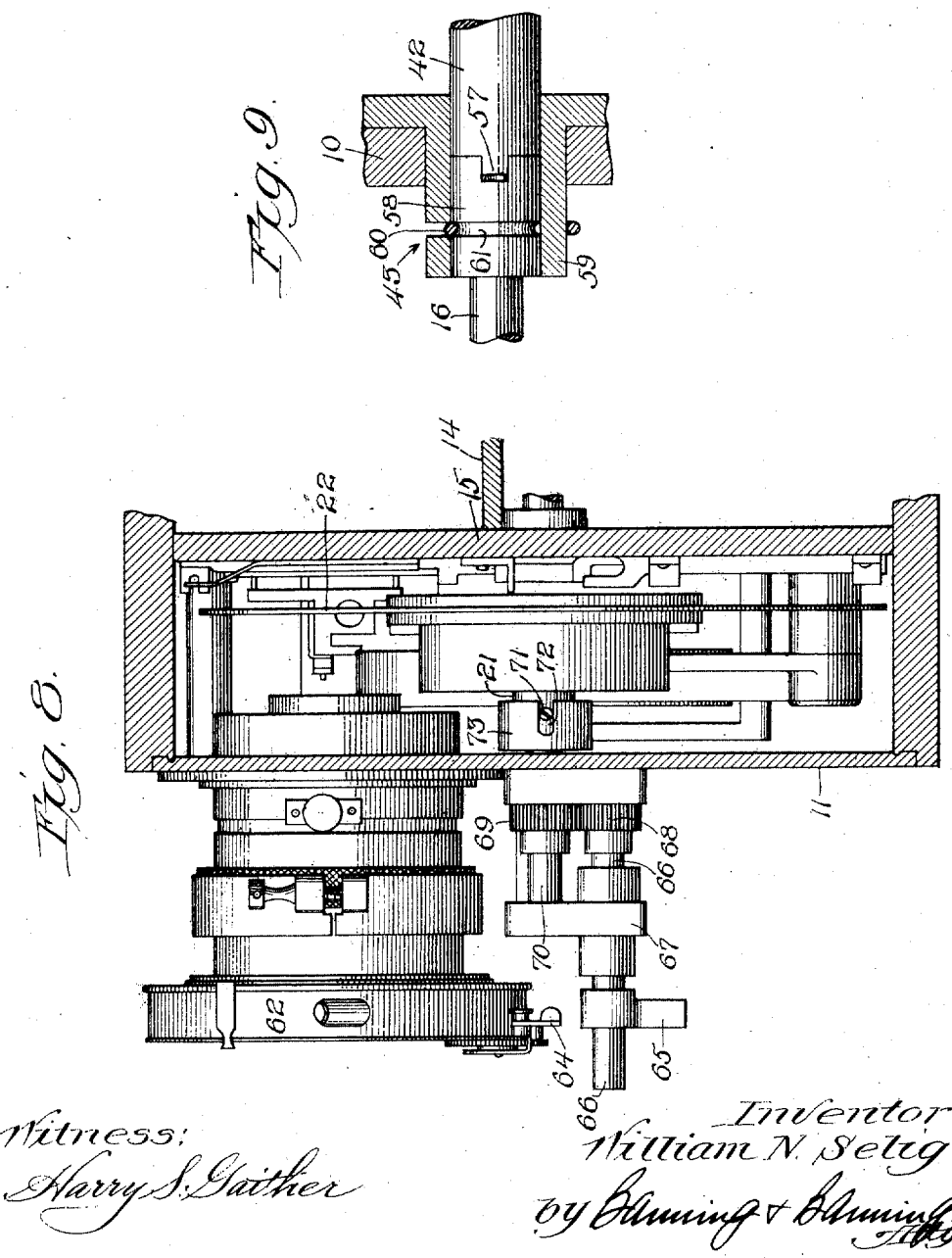

UNITED STATES PATENT OFFICE.

WILLIAM N. SELIG, OF CHICAGO, ILLINOIS, ASSIGNOR TO THE SELIG POLYSCOPE COMPANY, OF CHICAGO, ILLINOIS, A CORPORATION OF ILLINOIS.

MOVING-PICTURE CAMERA.

1,253,285.  Specification of Letters Patent.  Patented Jan. 15, 1918.

Application filed March 6, 1917.  Serial No. 152,592.

*To all whom it may concern:*

Be it known that I, WILLIAM N. SELIG, a citizen of the United States, residing at Chicago, in the county of Cook and State of Illinois, have invented certain new and useful Improvements in Moving-Picture Cameras, of which the following is a specification.

The present invention pertains to mechanism designed as an attachment for or in connection with a moving picture-taking camera, for the purpose of operating the camera at variable rates of speed, depending upon the ratio of movement exhibited in the natural scene or object as compared with the ratio which it is desired to produce in the exhibition of the film itself. In certain phenomena of nature, such as the rising of the sun, the opening of a flower, or the like, the natural rate of movement is entirely too slow to meet the requirements of moving picture exhibition, and in order to secure sufficient speed in the image projected from the film it is necessary to time the exposures at widely spaced intervals as compared with the speed of projection. Thus, in the case of the rising sun, it may be desirable to make the exposures at the rate of one per second or thereabout, and to project the completed film sections at the rate of ten per second, which, of course, speeds up the movement of the sun in the ratio of ten to one.

The present invention is provided with gearing which enables the mechanism to be driven by a motor or the like running at a uniform speed, and at the same time permits a very considerable variation in the frequency of exposure, depending upon the ratio desired.

In operating a taking camera at normal or natural speed, the exposures occur with sufficient frequency to permit the employment of an ordinary segmental revolving shutter which moves with sufficient rapidity to reduce the time of each exposure to the fraction of a second required to register the impression on the sensitized film. Where the speed is materially reduced, however, the use of such a shutter is unfeasible or objectionable, since it would result in an over exposure of each film section, and to overcome this difficulty the present invention makes use of a diaphragm shutter which is tripped for each exposure, and then automatically closes to prevent over exposure prior to the time when a subsequent exposure is effected.

The invention consists in the features of construction and combination of parts hereinafter described and claimed.

In the drawings:

Figure 1 is a side elevation of a moving picture camera employing the features of the present invention and with the outer door or wall of the casing removed;

Fig. 2 is an enlarged edge elevation of the change gear mechanism;

Fig. 3 is a rear elevation of the same, showing the connecting socket studs in section;

Fig. 6 is a front end elevation of the segmental shutter mechanism with the front wall of the casing removed;

Fig. 7 is a front end elevation with the front wall in place to show the diaphragm shutter and trip;

Fig. 8 is a top or plan view of the front portion of the casing with the top removed to expose the interior mechanism; and Fig. 9 is a screw partly in section, showing the clutch for the change gears.

Figure 4:
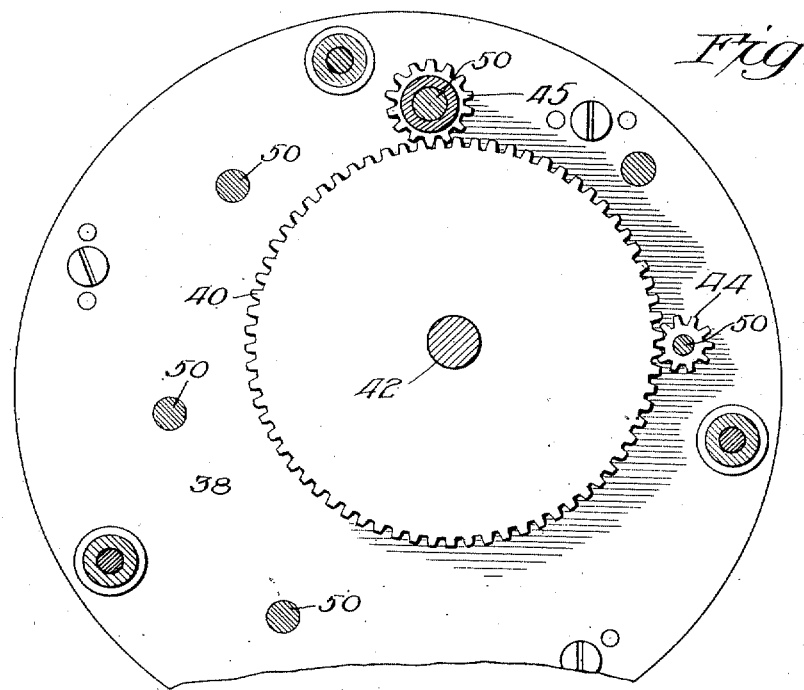
Figs. 4 and 5 are sectional elevations of the gear mechanism, showing the respective sets of pinions employed.

It will be understood that the mechanism of the present invention is designed to be applied to or incorporated with the regulation film feeding mechanism of a moving picture-taking machine, so that it is not deemed necessary to show the film feed, which is of the usual and well known construction.

The present invention is applied to a camera of the usual rectangular shape, and, as shown in Fig. 1, the camera is provided with a rear end wall 10, a front end wall 11, which is made removable, a bottom wall 12, a top wall 13, and side walls not shown.

In Fig. 1, the left hand side wall, looking toward the front, is removed to expose the interior, and since this side wall is merely in the form of a door or the like, without connection with the inclosed mechanism, it is not deemed necessary to further refer to it.

The mechanism comprising the present invention is mounted upon and carried by the front and rear walls 10 and 11 respectively, and an interior longitudinal partition wall 14, which divides the camera longitudinally through the middle and furnishes a film chamber, not shown, and an operating chamber, which latter houses certain of the features of the present invention.

In addition to the longitudinal partition wall, the camera is provided near its front end with a transverse inside partition wall 15, best shown in Figs. 6 and 8, which latter wall affords a mounting for the rotating shutter and associated parts. The front wall 11, best shown in Fig. 7, is made removable, and this wall carries the diaphragm shutter and trip mechanism to be presently described. The rear wall affords a mounting for the change speed gear mechanism, which constitutes an essential part of the present invention.

The power employed for synchronously driving the film feed and operating the diaphragm shutter in timed relation thereto is imparted through a main driving shaft 16, which extends longitudinally through the chamber which houses the driving mechanism, and this shaft at its forward end carries a spur pinion 17, which in turn meshes with a spur pinion 18 in train with a large intermediate pinion 19, which in turn meshes with an upper pinion 20 preferably having the same number of teeth as the pinions 17 and 18, so that the speed imparted to the pinion 20 will be equal to that imparted to the main driving shaft 16.

The upper pinion 20 is mounted upon a shaft 21, which at its forward end carries a revolving segmental shutter 22 of any suitable and well known type. This shaft passes through the forward cross partition wall 15 and is mounted within suitable bearings 23 and 24 respectively. The shaft 21 also serves to transmit motion to suitable film feeding mechanism 25, shown in Fig. 6, but since the specific construction of this film feed forms no part of the present invention, being of any usual and well known type, it is not deemed necessary to enter into a detailed description of the same. Suffice it to say, however, that the film feed mechanism, which derives its power from the shafting and gearing heretofore described, will, of course, operate in timed relation with the various mechanisms actuated from the same source of power.

The shaft 16 affords a driving element which is interchangeable with a cross driving shaft 26, shown in Fig. 1, which latter is the usual shaft to which a handle is applied when driving the mechanism at normal speed. The shaft 26 carries a grooved pulley wheel 27, which through the medium of an endless belt or band 28 serves to impart rotation to upper and lower film feed pulleys 29 and 30 mounted upon shafts 31 and 32 respectively. The shafts 31 and 32 at their farther ends carry the reeling mechanism for the film, but since this is of the usual type, and since its details are not concerned in the present invention, it is not deemed necessary to describe them. In order to maintain a suitable tension on the endless belt or band 28, an adjustable tension pulley 33 of the usual type is provided.

The normal driving shaft 26 behind the grooved pulley wheel 27 carries a face beveled gear 34 which meshes with a bevel pinion 35, the ratio between the two being two to one. The bevel pinion 35 is carried by a suitable shaft which also carries a spur pinion 36, which in turn meshes with a twin spur pinion 37 of equal size, the spur pinion 37 being integral with the intermediate spur pinion 19, but of a smaller size. The ratio between the intermediate spur pinion 19 and the spur pinion 20 is four to one, and this ratio multiplied by the ratio of two to one between the beveled gears gives a ratio of eight to one, which represents the speed of the rotating shutter and the film feed as compared with the rotation of the handle. This means that a single rotation of the handle will result in eight feeding and shutter movements with a consequent exposure of eight sections of film. This is the normal or usual operation for moving picture cameras, and when the camera is operated at this speed the rotating shutter may be solely relied upon to effect the exposures, since its rotation at this rate of speed will be sufficiently rapid to guard against over-exposure.

The normal driving mechanism operable from a handle attached to the cross shaft 26 is, *per se*, not deemed to be a part of the present invention, which consists essentially of means for imparting much slower rates of feeding movement through the longitudinally extending shaft 16, which receives its motion from gearing presently to be described. It will be noted, however, that the large intermediate spur gear 19 may be driven either through the medium of the small spur pinion 17 on the shaft 16 or through the train which derives its feeding movements from the shaft 26.

In order to impart varying speeds of rotation to the shaft 16, the gears particularly shown in Figs. 2 and 3 have been devised. These gears are carried by a frame consisting of inner and outer circular plates 38 and 39, the former of which is bolted or otherwise rigidly secured through the rear wall 10 of the casing. The gearing embodies a pair of large centrally driven gears 40 and 41, best shown in Figs. 4 and 5 respectively. The gear 40 is provided with 70 teeth and the gear 41 with 72 teeth. Both of these gears are rigidly mounted upon a center stub shaft 42, which is in direct alinement with the shaft 16. Both of these shafts are adapted to be clutched together by a suitable clutch 43, details of which are shown in Fig. 9 and which will be presently described. At this point it suffices to say that the shaft 16 is mounted for a limited longitudinal movement, which in the forward direction will serve to simultaneously uncouple the clutch and also to throw the pinions 17 and 18 out of mesh with one another.

The driven gears 40 and 41 are mounted in spaced relation to one another, as shown in Fig. 2, and each of these driven gears is adapted to be engaged by any one of its particular series of driving gears, the spacing of the driven gears serving to accommodate the meshing and intermeshing movements now to be described.

The gear 40, with its 70 teeth, is adapted to be engaged by the first driving pinion 44 with 10 teeth, or by the third driving pinion 45 with 14 teeth. The first of these engagements will result in a driving movement of seven to one, which is the slowest ratio of the series. When driving from the third pinion 45, the ratio of five to one will be maintained.

Figure 5:
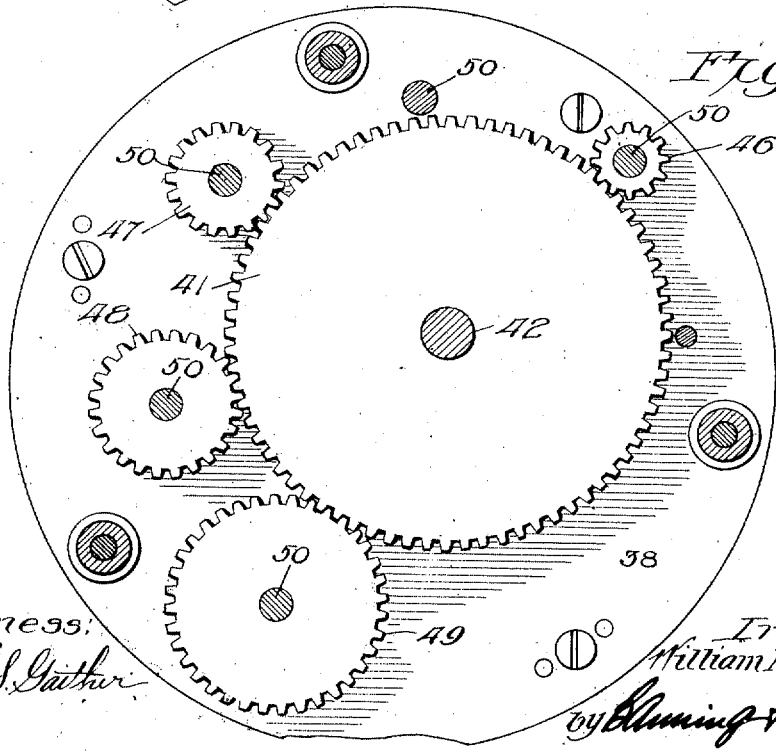

In order to secure the remaining ratios between seven to one and two to one, the pinions shown in Fig. 5 are provided. These pinions, as shown, are four in number, the second driving pinion 46, the fourth driving pinion 47, the fifth driving pinion 48, and the sixth driving pinion 49, having each respectively a number of teeth which is an even fraction of 72, the number of teeth on the driven pinion 41. Thus the second pinion 46 has 12 teeth, which gives a driving ratio of six to one; the fourth driving pinion 47 has 18 teeth, which gives a driving ratio of four to one; the fifth driving pinion 48 has 24 teeth, which gives a driving ratio of three to one; and the sixth driving pinion 49 has 36 teeth, with a driving ratio of two to one. By selecting the proper driving pinion and throwing it into mesh with the intended driven pinion, any one of the ratios mentioned can be employed as occasion may arise.

In order to provide for the adjustments mentioned, each of the pinions is mounted upon a longitudinally movable shaft 50 entered through a suitable boss 51 outstanding from the face of the plate 39. The shafts 50, at their inner ends, terminate in reduced extensions 52 which are journaled in bosses 53 outstanding from the forward face of the plate 48, which arrangement provides journal mountings for the respective shafts and allows the necessary longitudinal movements to each of the pinions, to enable it to engage with or disengage from the driven gear with which it coöperates. Thus the four driving pinions, which mesh with the driven gear 41 having 72 teeth, may be retracted to occupy the space intermediate the driven gears 40 and 41, while the two driving pinions 44 and 45, which mesh with the driven pinion 40 having 70 teeth, may be retracted to occupy the space outside of the periphery of said driven pinion.

In order to prevent the gears from being accidentally thrown into train, each of the shafts 50, near its outer end, is provided with a groove 54, which grooves are engaged by spring fingers 55, as shown in Fig. 3. Each of the shafts 50, at its outer end, is provided with a transversely extending pin 56, which enables the shaft to be clutched or otherwise secured to a suitable source of power, such, for instance, as a flexible shaft driven by an electric motor or the like.

In order to secure a driving speed of one to one with respect to the main shaft 16, the center shaft 42 is extended like the others, and when desired power may be applied directly to this shaft and the others thrown into unmeshed positions.

With the various ratios shown and heretofore described as a suitable embodiment of the present invention, it is apparent that a single rotation of the normal driving shaft 26 will produce eight exposures, with the accompanying feed movements, while if the power be derived from the slow speed shaft 16, a complete rotation of this shaft will produce but a single feed movement and but a single exposure, the pinions 17, 18 and 20 being all of the same size, and the large pinion 19 acting merely as a transmission element without changing the gear ratio.

When the slow speed shaft 16 is being utilized as the driving element, the shaft 26 will be in train with the shaft 16, which is necessary in order to impart the necessary feeding movements to the reel shafts 31 and 32. In these circumstances, the handle for the normal feeding shaft 26 will be removed, so that no inconvenience will be experienced. When, however, it is desired to drive the shaft 26 directly, in the normal operation of the machine, the shaft 16 will be thrown forward and the clutch 43 will be broken, so that the change speed gears will be thrown entirely out of commission.

The clutch 43, shown in enlarged detail in Fig. 9, consists of a driving element 57 on the end of the stub driving shaft 42, which engages with a driven clutch element 58 on the rear end of the shaft 16. The latter is slidably, rotatably mounted within a bushing 59 set into the rear wall 10 of the casing, and in order to maintain the shaft 16 in adjusted position a spring finger 60 is provided, which coöperates with a groove 61 in the driven clutch element 58, all as shown in Fig. 9.

As before stated, in order to time the exposures in conformity with the slow speed movements above described, it is necessary to employ a diaphragm shutter 62, which shutter is carried by the removable front wall 11 of the camera casing. The shutter is any one of the usual well known types of quick-acting photographic shutters, which may be timed to any degree desired for photographic purposes, depending upon weather conditions, speed of movement of the photographic subject, or the like. The shutter, of course, occupies a position immediately in advance of the exposure hole 63, behind which the film is fed in the usual manner, and it is necessary to time the opening of the diaphragm shutter to coincide in each case with the passage of the rotating segmental shutter 22, so that the latter will not interfere with the operation of the diaphragm shutter. In fact, when the diaphragm is in operation, the segmental shutter will merely run idle, and keep out of the way as it were.

The diaphragm shutter is provided with the usual trip finger 64, which occupies a position in the path of travel of a trip finger 65 projecting outwardly from a short stub trip shaft 66, which is journaled within a mounting 67 carried by and projecting forwardly from the removable front wall 11. The stub trip shaft 66 is provided with a spur pinion 68 which meshes with a similar spur pinion 69 of even size, which latter is carried by a stub driving shaft 70, which in effect constitutes the removable extension on the shaft 21. The latter is provided with a tooth or projection 71, which, as shown in Fig. 8, is designed to engage a slot 72 in a socket member 73 on the rear end of the driving stub shaft 70, which arrangement is desirable in that it enables the quick removal and replacement of the front wall 11 with the diaphragm shutter and associated parts, as occasion may require.

In normal operation, the machine will be rotated from the side by the handle at the normal taking speed, which, as before stated, will produce eight exposures for each turn of the handle. When operating in this way, the shaft 16 will be thrown forward, the change gears disconnected, and the diaphragm shutter adjusted to remain permanently open so as not to interfere with the operation of the rotating segmental shutter.

When it is desired to reduce the frequency of the exposures, the shaft 16 will be thrown to the rear and brought into mesh with the central stub driven shaft 42. The latter shaft can then be thrown in train with the selected stub driving shaft, or can be driven directly, at the will of the operator, so that a uniform speed, very much slower than normal, can be maintained, and all of the operating parts driven at the selected speed. This slows down all portions of the machine, with the exception of the diaphragm, which of necessity must operate with extreme rapidity, to prevent over-exposure, but by providing tripping mechanism for the diaphragm the speed of its operation will not be varied, although the frequency of its operation will be in time with the other operations. This arrangement enables the camera to be driven at uniform rates of slow speed, which would be difficult if not impossible to maintain by manual operation, and at the same time permits the taking of the slow phenomena of nature or of slowly moving objects, without immediate personal supervision of the operator, which, of course, effects a saving in the expense of production.

I claim:

1. In a moving picture camera, in combination with normal driving elements, supplemental driving elements adapted to operate the camera at selected relatively slow rates of speed, a shutter adapted to operate at a rate of speed commensurate with photographic requirements, and tripping mechanism operable by the supplemental driving mechanism for tripping the shutter in timed relation with the driving speed, substantially as described.

2. In a moving picture camera, in combination with normal driving elements, supplemental driving elements for operating the camera at relatively slow rates of speed, said supplemental driving elements comprising change gear elements for varying the supplemental driving speed, a shutter adapted to be operated at a speed commensurate with photographic requirements, and tripping mechanism therefor operated by the driving elements in timed relation with the driving speed, substantially as described.

3. In a moving picture camera, in combination with normal driving elements, supplemental driving elements for operating the camera at relatively slow rates of speed, said supplemental driving elements comprising change gear elements for varying the supplemental driving speed, a diaphragm shutter adapted to be operated at a speed commensurate with photographic requirements, and tripping mechanism therefor operated by the driving elements in timed relation with the driving speed, substantially as described.

4. In a motion picture camera, the combination of a power transmission shaft, transmission elements for operating the reel feed from said transmission shaft, variable gear elements adapted to selectively drive said shaft, said gear elements comprising a pair of main gears each having a different number of teeth, and a driving pinion for each of the main gears, having an even fractional ratio with its coöperating main gear, either of said pinions being movable into mesh with its main gear, and driving connections between both of the main gears and the power transmission shaft, a shutter adapted for adjustment to photographic requirements, and tripping mechanism operable by the power transmission shaft for tripping the shutter in timed relation with the driving speed, substantially as described.

5. In a motion picture camera, the combination of a power transmission shaft, transmission elements for operating the reel feed from said transmission shaft, variable gear elements adapted to selectively drive said shaft, said gear elements comprising a pair of main gears each having a different number of teeth, and a series of driving pinions for each of the main gears, each pinion having an even fractional ratio with its coöperating main gear, any one of said pinions being movable into mesh with its main gear, and driving connections between both of the main gears and the power transmission shaft, a shutter adapted for adjustment to photographic requirements, and tripping mechanism operable by the power transmission shaft for tripping the shutter in timed relation with the driving speed, substantially as described.

6. In a moving picture camera, the combination of a normal driving shaft extending transversely of the camera, gear connections between said driving shaft and the reel feed and the film feed, a supplemental longitudinally extending driving shaft in train with said gear connections, variable gear elements for driving the supplemental driving shaft, said variable gear elements consisting of two main gears each having a different number of teeth, each of said main gears coöperating with a series of driving pinions, and each pinion having a different even fractional tooth ratio with the gear with which it coöperates, any one of the pinions being movable into and out of mesh with its main gear, a connection between both of the main gears and the supplemental driving shaft, a shutter operable in conformity with photographic requirements, and a tripping mechanism in train with the supplemental driving shaft, for tripping the shutter in conformity with the driving speed, substantially as described.

7. In a moving picture camera, the combination of a transversely extending shaft for normal driving, a pulley carried by said shaft, connections between said pulley and the reel feeding mechanism, gearing, consisting in part of bevel gearing, between said shaft and the film feeding mechanism, a supplemental driving shaft, gearing on said shaft adapted to be thrown into and out of mesh with the first mentioned gearing, a diaphragm shutter adapted to be adjusted to photographic requirements, a trip for actuating said shutter, connections between the trip and the first mentioned gearing, for tripping the shutter in timed relation with the movement of the feeding mechanisms, and adjustable power transmission mechanism connected with the supplemental shaft for varying the speed thereof, substantially as described.

8. In a moving picture camera, the combination of a transversely extending shaft for normal driving, a pulley carried by said shaft, connections between said pulley and the reel feeding mechanism, gearing, consisting in part of bevel gearing, between said shaft and the film feeding mechanism, a supplemental driving shaft, gearing on said shaft adapted to be thrown into and out of mesh with the first mentioned gearing, a diaphragm shutter adapted to be adjusted to photographic requirements, a trip for actuating said shutter, connections between the trip and the first mentioned gearing, for tripping the shutter in timed relation with the movement of the feeding mechanism, and adjustable power transmission mechanism connected with the supplemental shaft for varying the speed thereof, said mechanism comprising a pair of main gears, each having a different number of teeth, and each main gear coöperating with a driving pinion having a fractional tooth ratio with respect to the coöperating main gear and being movable into and out of mesh therewith, substantially as described.

9. In a moving picture camera, the combination of a transversely extending shaft for normal driving, a pulley carried by said shaft, connections between said pulley and the reel feeding mechanism, gearing, consisting in part of bevel gearing, between said shaft and the film feeding mechanism, a supplemental driving shaft, gearing on said shaft adapted to be thrown into and out of mesh with the first mentioned gearing, a diaphragm shutter adapted to be adjusted to photographic requirements, a trip for actuating said shutter, connections between the trip and the first mentioned gearing, for tripping the shutter in timed relation with the movement of the feeding mechanisms, and adjustable power transmission mechanism connected with the supplemental shaft for varying the speed thereof, said transmission mechanism comprising two main gears in spaced relation, each having a different number of teeth, and each main gear coöperating with a set of pinions, each pinion having a different fractional tooth ratio with respect to its main gear, and the pinions being longitudinally movable into and out of mesh with the respective coöperating main gears, substantially as described.

WILLIAM N. SELIG.

Copies of this patent may be obtained for five cents each, by addressing the "Commissioner of Patents, Washington, D. C."